US008538191B2

(12) United States Patent
Kim et al.

(10) Patent No.: US 8,538,191 B2
(45) Date of Patent: Sep. 17, 2013

(54) IMAGE CORRECTION APPARATUS AND METHOD FOR ELIMINATING LIGHTING COMPONENT

(75) Inventors: Do-Hyeon Kim, Suwon-si (KR); Hee-Bum Ahn, Seoul (KR); Seong-Taek Hwang, Pyeongtaek-si (KR)

(73) Assignee: Samsung Electronics Co., Ltd. (KR)

( * ) Notice: Subject to any disclaimer, the term of this patent is extended or adjusted under 35 U.S.C. 154(b) by 229 days.

(21) Appl. No.: 12/943,670

(22) Filed: Nov. 10, 2010

(65) Prior Publication Data
US 2011/0110595 A1 May 12, 2011

(30) Foreign Application Priority Data
Nov. 11, 2009 (KR) .................. 10-2009-0108715

(51) Int. Cl.
*G06K 9/40* (2006.01)
(52) U.S. Cl.
USPC .............. 382/274; 382/275; 345/20; 358/461
(58) Field of Classification Search
USPC ................................ 382/254–275
See application file for complete search history.

(56) References Cited

U.S. PATENT DOCUMENTS

| 4,527,892 | A | * | 7/1985 | Yamane et al. | 356/3.04 |
|---|---|---|---|---|---|
| 4,601,574 | A | * | 7/1986 | Yamane et al. | 356/3.04 |
| 5,095,203 | A | * | 3/1992 | Sato et al. | 250/222.1 |
| 5,194,008 | A | * | 3/1993 | Mohan et al. | 434/22 |
| 5,268,773 | A | * | 12/1993 | Park et al. | 358/466 |
| 5,715,377 | A | * | 2/1998 | Fukushima et al. | 358/1.9 |
| 6,259,827 | B1 | * | 7/2001 | Nichani | 382/291 |
| 6,731,800 | B1 | * | 5/2004 | Barthel et al. | 382/176 |
| 6,771,836 | B2 | * | 8/2004 | Lawton | 382/260 |
| 6,816,613 | B2 | * | 11/2004 | Tohyama et al. | 382/167 |
| 6,865,290 | B2 | * | 3/2005 | Kohchi | 382/165 |
| 6,970,606 | B2 | * | 11/2005 | Lee et al. | 382/270 |
| 7,013,043 | B2 | * | 3/2006 | Kashioka | 382/167 |
| 7,029,437 | B2 | * | 4/2006 | Kobayashi | 600/180 |
| 7,064,759 | B1 | * | 6/2006 | Feierbach et al. | 345/469.1 |
| 7,095,889 | B2 | * | 8/2006 | Kashioka | 382/164 |
| 7,379,593 | B2 | * | 5/2008 | Fan et al. | 382/173 |
| 7,400,777 | B2 | * | 7/2008 | Wang et al. | 382/254 |
| 7,403,658 | B2 | * | 7/2008 | Lin et al. | 382/209 |
| 7,430,497 | B2 | * | 9/2008 | Wang et al. | 703/2 |
| 7,471,830 | B2 | | 12/2008 | Lim et al. | |
| 7,519,281 | B2 | * | 4/2009 | Lee et al. | 396/15 |
| 7,528,848 | B2 | * | 5/2009 | Xu et al. | 345/626 |

(Continued)

FOREIGN PATENT DOCUMENTS

JP 02047693 A * 2/1990
JP 2001297303 A * 10/2001

(Continued)

*Primary Examiner* — Jayesh A Patel
*Assistant Examiner* — Iman K Kholdebarin
(74) *Attorney, Agent, or Firm* — The Farrell Law Firm, P.C.

(57) ABSTRACT

An image correction apparatus and method for eliminating a lighting component are provided. A photographed original image is divided into a plurality of block units to calculate a representative brightness value of each of the divided block units. A background image having the size of the original image is generated using the calculated brightness value and interpolation. A lighting component is extracted from the background image and a lighting component included in the original image is eliminated using the extracted lighting component.

9 Claims, 6 Drawing Sheets

(56) References Cited

U.S. PATENT DOCUMENTS

| | | | |
|---|---|---|---|
| 7,532,767 B2* | 5/2009 | Oztan et al. | 382/268 |
| 7,702,162 B2 | 4/2010 | Cheong et al. | |
| 7,920,753 B2* | 4/2011 | Wang et al. | 382/254 |
| 8,091,038 B1* | 1/2012 | Johnson et al. | 715/768 |
| 8,116,525 B2* | 2/2012 | Guo et al. | 382/103 |
| 8,194,967 B2* | 6/2012 | Fukusawa et al. | 382/141 |
| 8,223,163 B2* | 7/2012 | Nobori | 345/581 |
| 8,228,272 B2* | 7/2012 | Peng et al. | 345/87 |
| 8,243,011 B2* | 8/2012 | An et al. | 345/102 |
| 8,290,293 B2* | 10/2012 | Ohk | 382/274 |
| 8,385,684 B2* | 2/2013 | Sandrew et al. | 382/284 |
| 2001/0012399 A1* | 8/2001 | Tohyama et al. | 382/167 |
| 2002/0048404 A1* | 4/2002 | Fahraeus et al. | 382/188 |
| 2002/0179717 A1* | 12/2002 | Cummings et al. | 235/462.25 |
| 2003/0030638 A1* | 2/2003 | Astrom et al. | 345/420 |
| 2003/0118233 A1* | 6/2003 | Olsson | 382/173 |
| 2003/0152285 A1* | 8/2003 | Feldmann et al. | 382/274 |
| 2003/0174235 A1* | 9/2003 | Barkan et al. | 348/362 |
| 2004/0085302 A1* | 5/2004 | Wang et al. | 345/181 |
| 2004/0153649 A1* | 8/2004 | Rhoads et al. | 713/176 |
| 2005/0106365 A1* | 5/2005 | Palmer et al. | 428/195.1 |
| 2006/0008129 A1* | 1/2006 | Lee et al. | 382/124 |
| 2006/0182309 A1* | 8/2006 | Wang et al. | 382/100 |
| 2006/0269134 A1* | 11/2006 | Wang et al. | 382/181 |
| 2007/0001950 A1* | 1/2007 | Zhang et al. | 345/88 |
| 2007/0009173 A1* | 1/2007 | Wakabayashi | 382/274 |
| 2007/0042165 A1* | 2/2007 | Wang et al. | 428/204 |
| 2008/0012942 A1* | 1/2008 | Kawamura et al. | 348/164 |
| 2008/0310700 A1* | 12/2008 | Fukusawa et al. | 382/141 |
| 2009/0067715 A1* | 3/2009 | Spruck | 382/172 |
| 2009/0067743 A1* | 3/2009 | Wang et al. | 382/274 |
| 2009/0110308 A1* | 4/2009 | Wang et al. | 382/233 |
| 2009/0207431 A1* | 8/2009 | Imai | 358/1.9 |
| 2009/0245657 A1* | 10/2009 | Osugi | 382/209 |
| 2010/0160172 A1* | 6/2010 | Erlich et al. | 506/8 |
| 2010/0208099 A1* | 8/2010 | Nomura | 348/223.1 |
| 2011/0038535 A1* | 2/2011 | Wang et al. | 382/164 |
| 2011/0102454 A1* | 5/2011 | Miyakoshi et al. | 345/589 |
| 2011/0110595 A1* | 5/2011 | Kim et al. | 382/190 |
| 2011/0187900 A1* | 8/2011 | Park et al. | 348/239 |
| 2011/0193778 A1* | 8/2011 | Lee et al. | 345/158 |
| 2011/0221933 A1* | 9/2011 | Yuan et al. | 348/234 |
| 2011/0280309 A1* | 11/2011 | Francois et al. | 375/240.16 |
| 2011/0317935 A1* | 12/2011 | Anan et al. | 382/274 |
| 2012/0019524 A1* | 1/2012 | Nobori | 345/419 |
| 2012/0133793 A1* | 5/2012 | Inaba et al. | 348/229.1 |
| 2012/0154659 A1* | 6/2012 | Wang | 348/333.1 |

FOREIGN PATENT DOCUMENTS

| | | |
|---|---|---|
| JP | 2003307580 A * | 10/2003 |
| JP | 2009171291 A * | 7/2009 |
| KR | 1020040081682 | 9/2004 |
| KR | 1020060044806 | 5/2006 |
| KR | 1020060090480 A | 8/2006 |
| KR | 100801989 | 2/2008 |
| KR | 1020080096263 | 10/2008 |

* cited by examiner

IMAGE CORRECTION APPARATUS AND METHOD FOR ELIMINATING LIGHTING COMPONENT

PRIORITY

This application claims priority under 35 U.S.C. §119(a) to a Korean Patent Application filed in the Korean Intellectual Property Office on Nov. 11, 2009 and assigned Serial No. 10-2009-0108715, the entire disclosure of which is incorporated herein by reference.

BACKGROUND OF THE INVENTION

1. Field of the Invention

The present invention relates generally to an image correction apparatus and method, and more particularly, to an apparatus and method for correcting an image including characters.

2. Description of the Related Art

Generally, Optical Character Recognition (OCR) refers to a technique for searching a character region by analyzing an image and recognizing characters in the searched character region Such an OCR technique, which is in the field of pattern recognition, enables a computer to directly perform pattern recognition without a user having to input characters through a keyboard, by automatically reading and recognizing printed characters or handwritten characters and converting them into computer comprehensible codes.

In this type of OCR technique, binarization and pre-processing operations are performed prior to an OCR operation. In other words, an image is converted into values of 0s and 1s through the binarization and pre-processing operations so that the image can be comprehensible to a computer during the OCR operation. For more accurate recognition of characters by a computer, a process for enhancing an image is required during the binarization and pre-processing operations. However, if binarization and pre-processing modules malfunction or have poor performance, the OCR operation cannot be properly performed even though an OCR engine is performing properly.

Thus, in a conventional OCR technique, an acquired image is simply converted into computer comprehensible values of 0s and 1s so that the computer can automatically read and recognize characters.

However, the conventional OCR technique has difficulty recognizing characters by analyzing or processing an image photographed in ambient lighting or a shaded environment, which may occur in a mobile environment. Hence, the OCR engine does not properly binarize and, thus, the performance of the OCR engine may deteriorate.

Furthermore, in the conventional OCR technique, characters which include shade cannot be recognized as a result of poor binarization, caused by the shade generated by ambient lighting.

SUMMARY OF THE INVENTION

The present invention is designed to address at least the above-mentioned problems and/or disadvantages and to provide at least the advantages described below. Accordingly, an aspect of the present invention provides an image correction apparatus and method for smoothly performing an OCR operation by correcting the background lighting component of an image obtained in an ambient lighting or shade environment to enhance picture quality of the image.

According to an aspect of the embodiments of the present invention, an image correction apparatus for eliminating a lighting component includes a representative value calculator for dividing an original image into a plurality of block units and calculating a representative brightness value of each of the plurality of block units, a background image generator for generating a background image comprised of a plurality of pixels, each of the plurality of pixels having the representative brightness value as a brightness value, and a lighting component corrector for extracting a lighting component from the background image and eliminating a lighting component included in the original image using the extracted lighting component from a background image.

According to another aspect of the embodiments of the present invention, a method for eliminating a lighting component in an image correction apparatus includes dividing an original image into a plurality of block units, calculating a representative brightness value of each of the plurality of block units, generating a background image comprised of a plurality of pixels, each of the plurality of pixels having the representative brightness value as a brightness value, and extracting a lighting component from the background image and eliminating a lighting component included in the original image using the extracted lighting component from the background image.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE EMBODIMENTS OF THE PRESENT INVENTION

Reference will now be made in detail to the embodiments of the present invention with reference to the accompanying drawings. The following detailed description includes specific details in order to provide a thorough understanding of the present invention. However, it will be apparent to those skilled in the art that the present invention may be practiced without such specific details.

Figure 1:
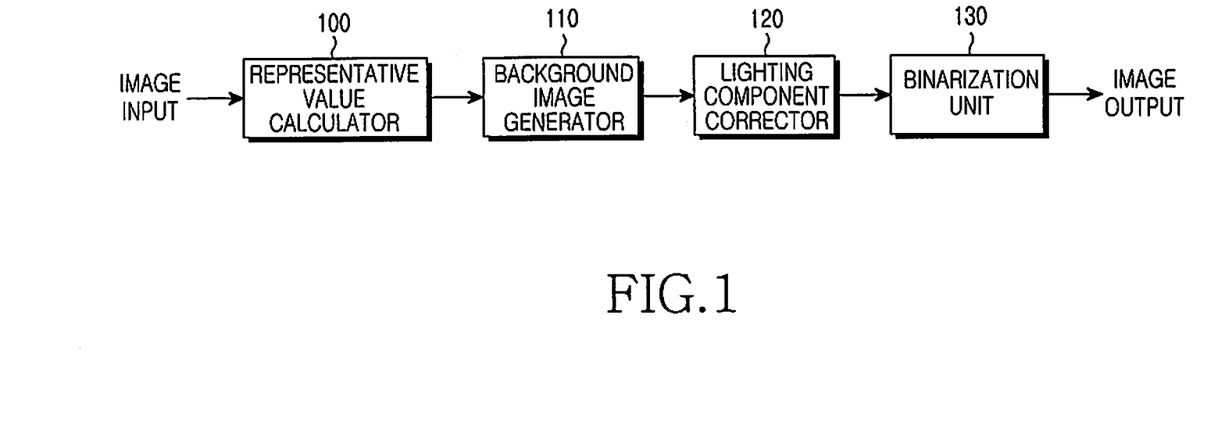
FIG. 1 is a block diagram illustrating a configuration of an image correction apparatus according to an embodiment of the present invention.

FIG. 1 is a block diagram illustrating a configuration of an image correction apparatus according to an embodiment of the present invention.

Referring to FIG. 1, the image correction apparatus includes a representative value calculator 100, a background image generator 110, a lighting component corrector 120, and a binarization unit 130.

The representative value calculator 100 divides an input image, which may have been photographed through a camera, included in a terminal into p blocks each having a size of m pixels wide and n pixels long and calculates a representative brightness value of each of the p blocks. Here, m, n, and p denote integers.

Figure 2A:
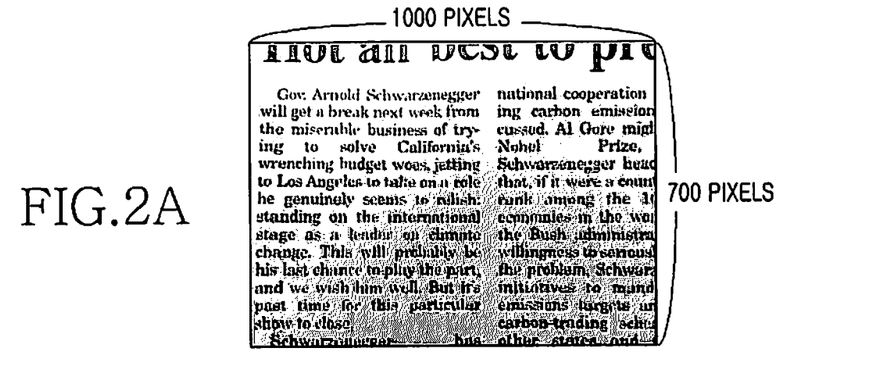
FIGS. 2A to 2C are diagrams illustrating a process for extracting a lighting component from an input image according to an embodiment of the present invention.
Figure 2B:
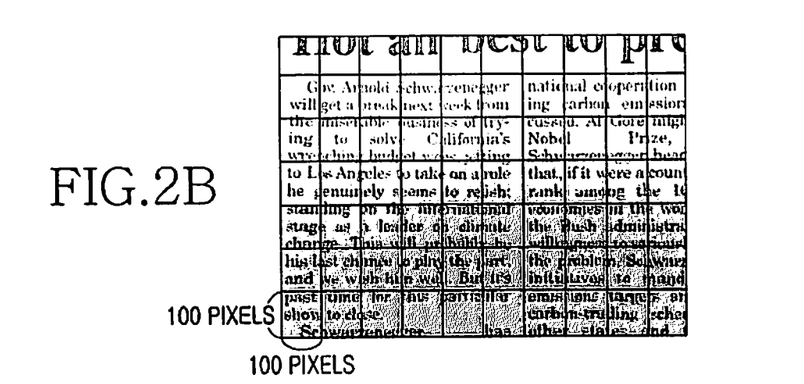
Figure 2C:
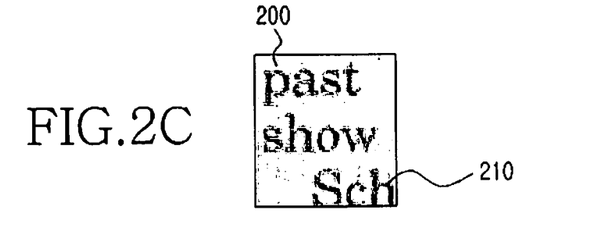

FIGS. 2A to 2C are diagrams illustrating a process for extracting a lighting component from an input image according to an embodiment of the present invention.

It is assumed that an original image is input with a size of 1000 pixels wide and 700 pixels long as illustrated in FIG. 2A.

The representative value calculator 100 of FIG. 1 divides the original image into 70 blocks each being 100 pixels wide and 100 pixels long as illustrated in FIG. 2B. Next, the representative value calculator 100 calculates an average background brightness value of each of the 70 divided blocks. The calculated average background brightness value becomes a representative background brightness value of each block.

More specifically, the representative value calculator 100 calculates a representative background brightness value by determining whether a brightness value of each of a plurality of pixels included in one of the 70 divided blocks as shown in FIG. 2C is greater than a preset threshold brightness value. The preset threshold brightness value may be any value between 0 and 255 or may be an average brightness value of the entire pixels of a corresponding block. For example, assuming that the preset threshold brightness value is 180, if a brightness value of a pixel denoted by a reference numeral 200 in FIG. 2C is 160, the brightness value of the pixel 200 is less than the threshold brightness value, and if a brightness value of a pixel denoted by a reference numeral 210 is 200, the brightness value of the pixel 210 is greater than the threshold brightness value.

Next, the representative value calculator 100 calculates an average brightness value of pixels having brightness values above the preset threshold brightness value.

For example, if pixels corresponding to strokes of characters have dark brightness and pixels corresponding to background have relatively bright brightness, the representative value calculator 100 calculates, as a representative value, an average brightness value of pixels having brightness values above the preset threshold brightness value. On the contrary, if pixels corresponding to strokes of characters have bright brightness and pixels corresponding to background have relatively dark brightness, the representative value calculator 100 calculates, as a representative value, an average brightness value of pixels having brightness values below the preset threshold brightness value.

If 700 pixels out of 10,000 pixels have brightness values above the preset threshold brightness value, the representative value calculator 100 calculates an average brightness value of the 700 pixels. The calculated average brightness value becomes a representative brightness value of the block illustrated in FIG. 2C.

In order to generate a background image, the background image generator 110 generates, as one temporary image, p pixels, each having the representative brightness value calculated with respect to each of the p divided blocks and magnifies the generated temporary image to the same size as the original image, using interpolation such as bilinear interpolation. In this case, interpolation such as bilinear interpolation is used while p pixels are increased until equaling the number of pixels of the original image. Accordingly, variations of brightness values of the background image appear in gradated form and, thus, a natural background image is generated.

Figure 3A:
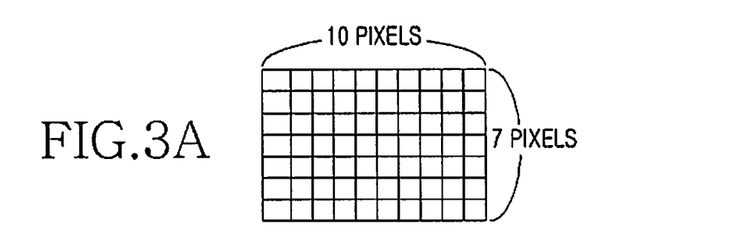
FIGS. 3A to 3C are diagrams illustrating a process for extracting a background image according to an embodiment of the present invention.
Figure 3B:
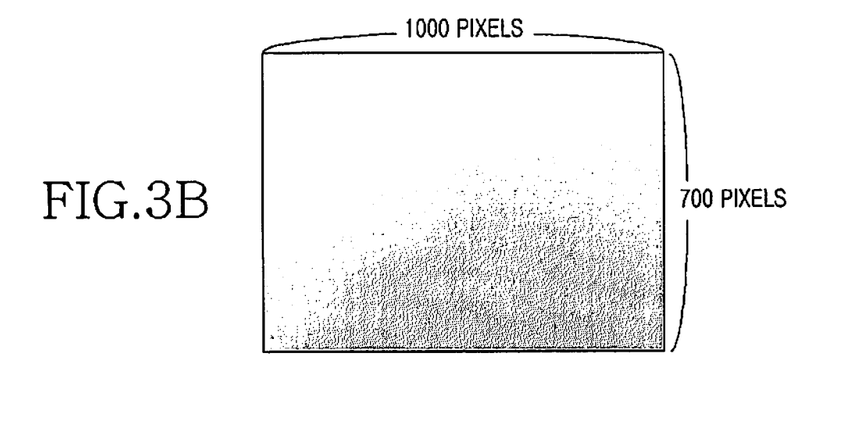
Figure 3C:
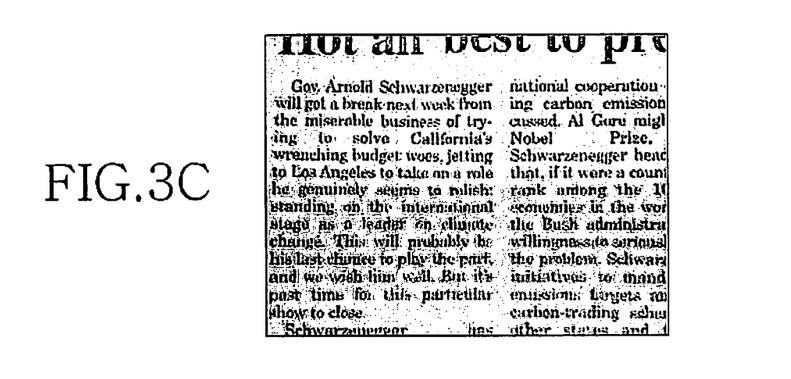

FIGS. 3A to 3C are diagrams illustrating a process for extracting a background image according to an embodiment of the present invention.

The background image generator 110 generates one temporary image having 70 (1×1) pixels having average representative background brightness values, as representative brightness values, calculated in the representative value calculator 100 with respect to the 70 blocks. The generated temporary image is 10 pixels wide and 7 pixels long, as illustrated in FIG. 3A.

The background image generator 110 converts the temporary image into a size of the original image, i.e., 1000 pixels wide and 700 pixels long, as illustrated in FIG. 2A. In this case, the background image generator 110 generates a background image by resizing each pixel of 10 pixels wide and 7 pixels long to 10 times its original size.

The background image generator 110 generates the background image by interpolating the temporary image using interpolation such as bilinear interpolation. As a result, the background image appears as a natural form like the background of the original image.

The generated background image includes a lighting component such as shade generated by lighting as in the original image. The generated background image may be shown as in FIG. 3B.

The lighting component corrector 120 compares the original image with the background image shown in FIG. 3B and eliminates a lighting component included in the original image, thereby generating a corrected image.

More specifically, the lighting component corrector 120 eliminates a lighting component included in each pixel of the original image, using a brightness value of a pixel of the background image corresponding to a lighting component included in each pixel of the original image, and an average brightness value, a standard deviation and a maximum brightness value of all pixels of the background image.

If a brightness value of a specific pixel of the background image is less than an average brightness value of entire pixels, because the pixel indicates a dark pixel, the lighting component corrector 120 adds a brightness value to the brightness value of the pixel to make the pixel bright. If a brightness value of a specific pixel of the background image is greater than an average brightness value of entire pixels, because the pixel indicates a brightness pixel, the lighting component corrector 120 subtracts a brightness value from the brightness value of the pixel to make the pixel dark. Namely, the lighting component corrector 120 may generate an original image F(x,y) in which a lighting component is eliminated using Equation (1).

$$F(x, y) = I(x, y) + (B_{mean} - B(x, y)) \times \frac{(B_{max} - B_{std})}{B_{max}} \quad (1)$$

In Equation (1), I(x,y) and B(x,y) indicate brightness values of pixels on (x,y) coordinates of the original image and the background image, respectively, and $B_{mean}$, $B_{max}$ and $B_{std}$ indicate an average brightness value, a maximum brightness value and a standard deviation of the brightness of the background image, respectively.

The lighting component corrector 120 calculates the average brightness value $B_{mean}$, the maximum brightness value $B_{max}$ and the standard deviation $B_{std}$ from the generated background image.

If the original image is less influenced by lighting, there is a small difference between the brightness values of pixels of the background image, but if it is not, there is a large difference between brightness values of pixels of the background image. In other words, because an image which is greatly influenced by lighting includes various regions ranging from bright background to dark background, brightness values of pixels of the background image are distributed over a wide range.

In order to eliminate a lighting component from the original image, brightness values of respective pixels are corrected so as to have a minor difference between brightness values of pixels of the background image. In this case, a brightness value corresponding to a difference $(B_{mean}-B(x,y))$ between the average brightness value $B_{mean}$ of the all pixels of the background image and the brightness value $B(x,y)$ of each pixel of the background image is corrected.

Because an image which is greatly influenced by lighting includes more pixels in which $(B_{mean}-B(x,y))$ is large, the amount of variations of brightness values is increased. As a result, pixels corresponding to strokes of characters as well as pixels of the background image have great variations in brightness values and are varied very brightly by binarization. Namely, pixels at the edge of a stroke of characters are binarized to pixels of the background image and therefore that thickness of the stroke may be thinner.

To reduce such an influence, the lighting component corrector 120 adjusts the amount of brightness variations by introducing the standard deviation $B_{std}$ of brightness values of pixels of the background image.

When the standard deviation of brightness values of pixels of the background image is large, a difference between brightness values of pixels is also large. This means that an image is greatly influenced by lighting.

Accordingly a weight value of a brightness variation is defined as $$\frac{(B_{max} - B_{std})}{B_{max}}$$

so that the amount of variation in brightness values which must be corrected is decreased in an image having a big standard deviation and the amount of variations of brightness values is increased in an image having a small standard deviation.

An example of a corrected image generated by Equation (1) is shown in FIG. 3C.

The binarization unit 130 performs a binarization operation on the corrected image generated through the lighting component corrector 120 and converts the corrected image into computer comprehensible codes such as 0s and 1s. The binarized image may be shown as in FIG. 5B.

As previously described, according to an embodiment of the present invention, a background image is extracted from an original image divided into n blocks, a lighting component included in the original image is eliminated by comparing the extracted background image with the original image, and a binarization operation is performed. As a result, the quality of an image is improved and characters are more clearly recognized.

Hereinafter, a process for generating a corrected image in which a lighting component included in an original image is eliminated in an image correction apparatus according to an embodiment of the present invention is described with reference to FIG. 4.

Figure 4:
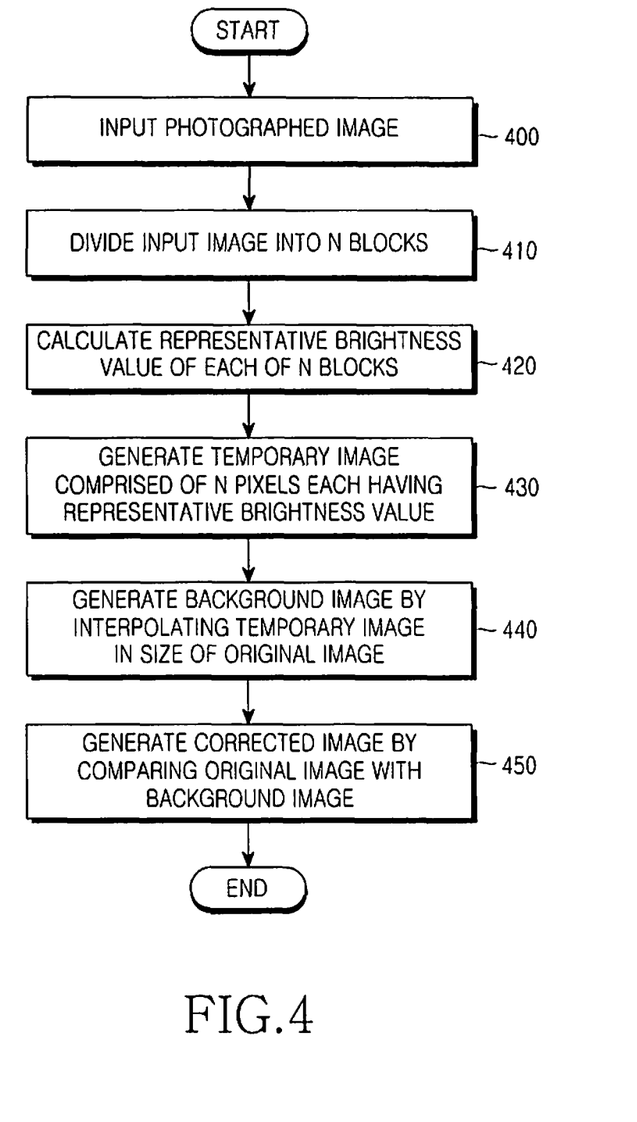
FIG. 4 is a flow chart illustrating a process for eliminating a lighting component in an image correction apparatus according to an embodiment of the present invention.

Referring to FIG. 4, if an original image photographed through a camera included in a terminal is input in step 400, the representative value calculator 100 divides the input original image into n (where n is an integer) blocks in step 410. More specifically, referring to FIGS. 5A and 5B, the representative value calculator 100 divides an original image 500 into an image 510.

For example, if the original image is 800 pixels wide and 500 pixels long, the representative value calculator 100 may divide the original image into a total of 40 blocks each being 100 pixels wide and 100 pixels long.

In step 420, the representative value calculator 100 calculates a representative brightness value of each of the n divided blocks. As described above, the representative value calculator 100 may calculate the representative brightness value by calculating an average brightness value of pixels having brightness values above a preset threshold brightness value among pixels included within the blocks.

In step 430, the background image generator 110 generates, as one image, n pixels each having, as a brightness value, the representative brightness value calculated with respect to each of the n divided blocks. For example, when the number of blocks of the divided image 510 in FIG. 5A is 40, the background image generator 110 generates an image 520 of a size of 40 (1×1) pixels each having the representative brightness value of each of the 40 blocks as a brightness value.

Figure 5A:
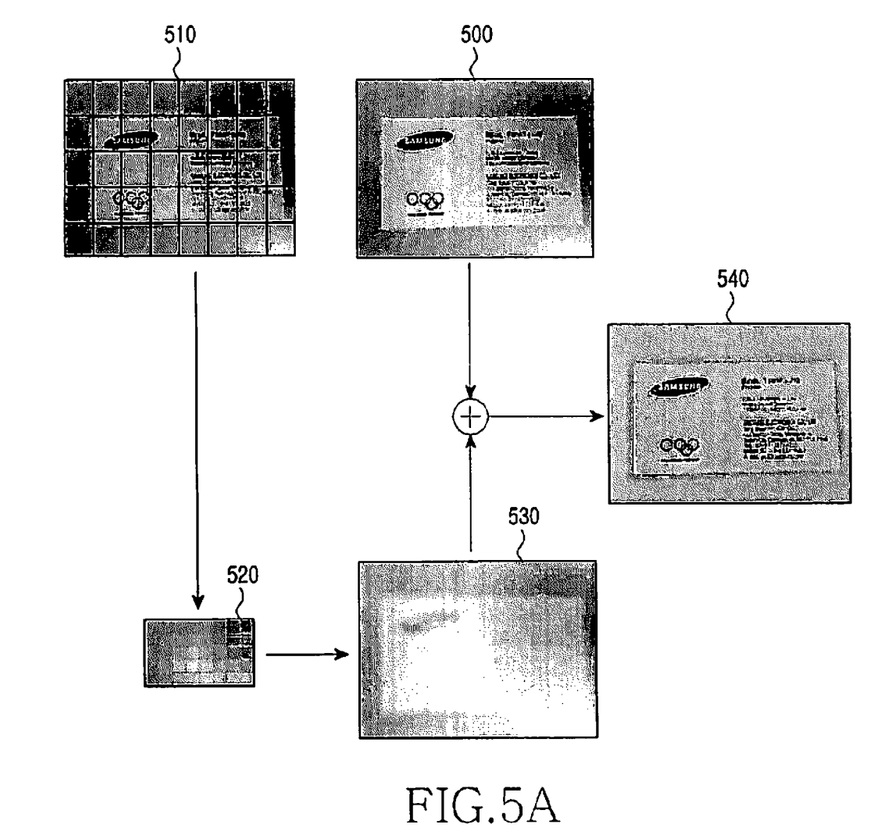
FIGS. 5A and 5B are diagrams illustrating a process for eliminating a lighting component in an image correction apparatus according to an embodiment of the present invention.
Figure 5B:
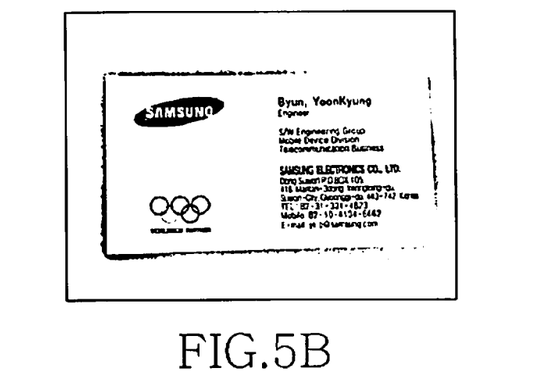

In step 440, the background image generator 110 converts the size of the generated image 520 into the size of an original image, as denoted by a reference numeral 530 in FIG. 5A, using an interpolation technique such as bilinear interpolation.

When the size of an image in which pixels having different brightness values are gathered is converted into the size of the original image, a boundary between pixels appears clearly and an image of a rough mosaic form is generated. To correct the generated image to a natural image, the background image generator 110 interpolates the generated image using general interpolation, thereby generating, for example, a background image 530 of FIG. 5A.

In step 450, the lighting component corrector 120 compares the original image 500 with the background image 530 and generates, for example, a corrected image 540 in which a lighting component included in the original image 500 is eliminated. The lighting component corrector 120 may eliminate a lighting component included in the original image using the above-described Equation (1).

Figure 6A:
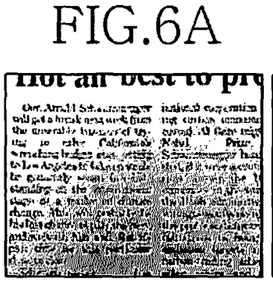
FIGS. 6A to 6F are diagrams explaining result images obtained by performing image correction according to an embodiment of the present invention and a conventional result image.
Figure 6B:
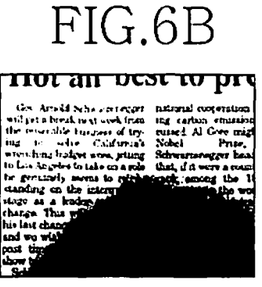
Figure 6C:
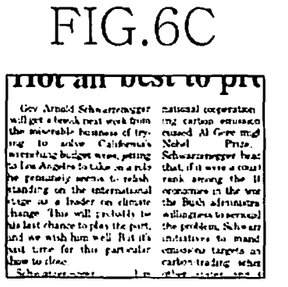
Figure 6D:
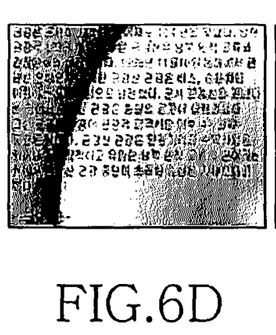
Figure 6E:
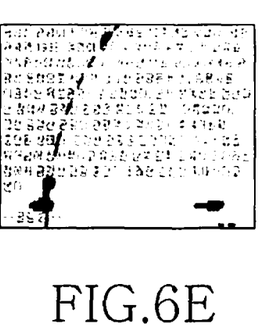

In a conventional technique, when original images as shown in FIGS. 6A and 6D including a lighting component such as shade is binarized using an OCR technique, characters in an image region including a lighting component cannot be clearly recognized as illustrated in FIGS. 6C and 6E.

Figure 6F:
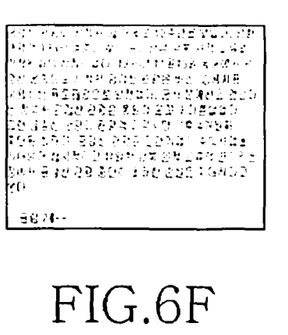

In accordance with an embodiment of the present invention, a background image is extracted from an original image divided into n blocks, a lighting component included in the original message is eliminated by comparing the extracted background image with the original image, and a binarization operation is performed. Then images as shown in FIGS. 6C and 6F are obtained and characteristics can be clearly recognized as compared with the conventional technique.

It is apparent that the image correction apparatus and method of the present invention may be achieved in a form of hardware, software (i.e., programs), or a combination thereof.

Such programs may be stored in machine (e.g., a computer) readable volatile or nonvolatile recording media. The recording media may be storage devices such as Read Only Memory (ROM), memory such as Random Access Memory (RAM), memory chips and integrated circuits, or optical or magnetic recording media such as Compact Discs (CDs), Digital Versatile Discs (DVDs), magnetic discs and magnetic tapes. The image correction apparatus and method of the present invention may be embodied in the form of a program including codes for achieving them. Further, such a program may be electrically transmitted through an arbitrary medium such as a communication signal propagated wired or wirelessly and the present invention includes equivalents thereto.

According to embodiments of the present invention, because characters can be accurately recognized by smoothly analyzing or processing an image photographed in an ambient lighting or shade environment which may occur in a mobile environment, an OCR engine can accurately perform binarization to recognize characters. Therefore, the performance of the OCR engine can be improved.

Moreover, according to embodiments of the present invention, characters included in a shaded region generated by ambient lighting in an obtained image can be accurately recognized.

Although certain embodiments of the present invention have been disclosed for illustrative purposes, various modifications, additions and substitutions are possible, without departing from the scope and spirit of the invention as disclosed in the accompanying claims. Accordingly, the scope of the present invention should not be limited to the description of the embodiment, but defined by the accompanying claims and equivalents thereof.

What is claimed is:

1. An image correction apparatus for eliminating a lighting component, comprising:
    a processor configured to execute functions comprising:
    a representative value calculator configured to:
        divide an original image into a plurality of block units, and
        calculate a representative brightness value of each of the plurality of block units;
    a background image generator configured to:
        generate a background image including a plurality of pixels, each of the plurality of pixels having the representative brightness value as a brightness value; and
    a lighting component corrector configured to:
        extract a lighting component from the background image, and
        eliminate a lighting component included in the original image using the extracted lighting component from the background image,
    wherein the lighting component corrector eliminates the lighting component by applying an amount of correction changed according to a weight value defined by a maximum brightness of the background image and a standard deviation of the background image.

2. The image correction apparatus of claim 1, wherein the representative value calculator detects pixels having brightness values greater than a preset threshold brightness value among a plurality of pixels included in an image of each of the plurality of block units, calculates an average brightness value of the detected pixels, and sets the average brightness value as the representative brightness value.

3. The image correction apparatus of claim 1, wherein the background image generator generates a temporary image including a plurality of pixels, each of the plurality of pixels having the representative brightness value as a brightness value and converts the temporary image into the background image having a same size as the original image.

4. A method for eliminating a lighting component in an image correction apparatus, comprising:
    dividing an original image into a plurality of block units;
    calculating a representative brightness value of each of the plurality of block units;
    generating a background image comprised of a plurality of pixels, each of the plurality of pixels having the representative brightness value as a brightness value;
    extracting a lighting component from the background image; and
    eliminating a lighting component included in the original image using the extracted lighting component from the background image,
    wherein eliminating the lighting component comprises:
    eliminating the lighting component by applying an amount of correction changed according to a weight value defined by a maximum brightness of the background image and a standard deviation of the background image.

5. The method of claim 4, wherein calculating the representative brightness value comprises:
    detecting pixels having brightness values greater than a preset threshold brightness value among a plurality of pixels included in an image of each of the plurality of block units;
    calculating an average brightness value of the detected pixels; and
    setting the average brightness value as the representative brightness value.

6. The method of claim 4, wherein generating the background image comprises:
    generating an image including a plurality of pixels, each of the plurality of pixels having the representative brightness value as a brightness value; and
    converting the generated image into the background image having a same size as the original image.

7. A non-transitory computer-readable recording medium having recorded thereon a program for eliminating a lighting component in an image correction, comprising:
    a first code segment for dividing an original image into a plurality of block units;
    a second code segment for calculating a representative brightness value of each of the plurality of block units;
    a third code segment for generating a background image comprised of a plurality of pixels, each of the plurality of pixels having the representative brightness value as a brightness value; and
    a fourth code segment for extracting a lighting component from the background image and eliminating a lighting component included in the original image using the extracted lighting component from the background image,
    wherein the fourth code segment eliminates the lighting component by applying an amount of correction changed according to a weight value defined by a maximum brightness of the background image and a standard deviation of the background image.

8. The computer-readable medium of claim 7, wherein calculating the representative brightness value comprises:
    detecting pixels having brightness values greater than a preset threshold brightness value among a plurality of pixels included in an image of each of the plurality of block units;
    calculating an average brightness value of the detected pixels; and setting the average brightness value as the representative brightness value.

9. The computer-readable medium of claim 7, wherein the generating the background image comprises:
   generating an image including a plurality of pixels, each of the plurality of pixels having the representative brightness value as a brightness value; and
   converting the generated image into the background image having a same size as the original image.

* * * * *